R. C. PIERCE.
ELECTRIC WELDING MACHINE.
APPLICATION FILED NOV. 14, 1912.
1,059,390.
Patented Apr. 22, 1913.
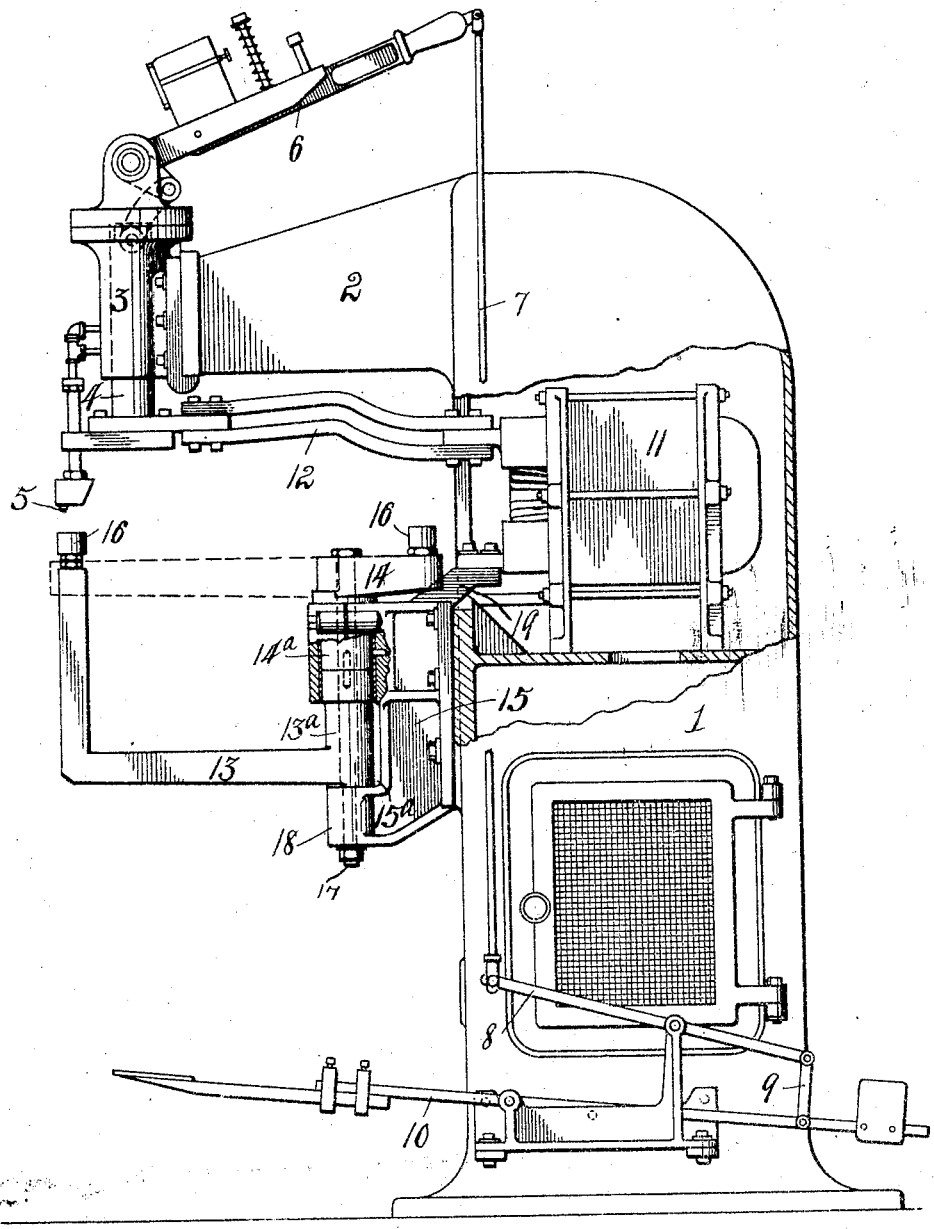
WITNESSES:
E. H. Bills
D. C. Walter
INVENTOR.
Robert Clark Pierce,
By Owen & Owen,
His attys

UNITED STATES PATENT OFFICE.

ROBERT CLARK PIERCE, OF CINCINNATI, OHIO, ASSIGNOR TO THE TOLEDO ELECTRIC WELDER COMPANY, OF CINCINNATI, OHIO, A CORPORATION OF OHIO.

ELECTRIC WELDING-MACHINE.

1,059,390.    Specification of Letters Patent.    Patented Apr. 22, 1913.

Application filed November 14, 1912. Serial No. 731,315.

*To all whom it may concern:*

Be it known that I, ROBERT CLARK PIERCE, a citizen of the United States, and a resident of Cincinnati, in the county of Hamilton and State of Ohio, have invented a certain new and useful Electric Welding-Machine; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to electric welding machines, and has for its object the provision, in a machine of this character, of a plurality of die-carrying arms or horns which are mounted for relative swinging or other suitable movements to enable them to be selectively moved into or out of operative welding position, as the form of the work being welded may require, such arms having different shapes or characteristics, as will be hereinafter more fully described.

The invention is fully described in the following specification, and while, in its broader aspect, it is capable of embodiment in numerous forms, a preferred embodiment thereof is illustrated in the accompanying drawings, which is a side elevation of an electric welding machine with parts broken away.

Referring to the drawings, 1 designates the frame of a machine of this character, which may be of any suitable shape or size and has the customary upper die-carrying horn 2 projecting laterally from its upper end, which horn is provided, in the present instance, at its outer end with a head 3 in which a plunger 4, carrying the upper movable die 5, is mounted. The reciprocatory movements of the plunger can be controlled by a lever 6, acting as a hand-lever, or such lever can be connected by a rod 7, intermediate lever 8 and link 9 to a foot-treadle 10. Any other control means however, may be provided for the plunger 4, as is well understood in the art. A transformer 11, which is mounted within the frame 1, has its secondary connected by a lead 12 with the die in the usual or any suitable manner.

In carrying out the feature of my invention I have shown the machine as provided with two lower die-carrying horns or arms 13 and 14, which are shaped to adapt them for different conditions of use, and mounted for coaxial horizontal swinging movements in a bracket 15, that is bolted or otherwise suitably attached to the frame 1. A die 16 is carried by each horn in proper position to be swung with the horn into proper register with the upper die 5, the dies swinging in a common plane. The horn 13, which is the lower one of the set, is of L-form with its free end projecting upward to adapt it to be projected up into a box or other article, as for welding the bottom thereof, while the other horn 14 is preferably straight or substantially so to enable it to be projected horizontally into a box or other article, as for welding the side seams or other side parts thereof.

The inner ends of the horns 13 and 14 are shown as having journal parts $13^a$ and $14^a$, respectively, which are mounted in a suitable bearing in the bracket 15, with the lower horn projecting from its journal through a recess or incut $15^a$ in the bracket. The upper horn 14 projects from the upper end of its journal over the bracket, and the two journals are held, against axial movements relative to the bracket by a bolt 17, which projects axially through both journals and through the bracket boss 18 upon which the lower journal rests. The bracket 15 is suitably insulated from the frame, and has an arm or boss 19 projecting from its upper end and directly bolted or otherwise suitably connected to the secondary of the transformer 11.

It is evident in the welding of boxes or similar articles that either horn 13, 14 can be swung into operative position as it may be desired to weld different portions of an article, as for instance the side and bottom portions thereof, thus materially facilitating the welding of such articles; and also that the number and shapes of the horns and the forms of the dies carried thereby can be varied as the conditions of use may require.

I wish it understood that my invention is not limited to any specific construction or arrangement of the parts except in so far as such limitations are specified in the claims.

Having thus described my invention, what I claim as new, and desire to secure by Letters Patent, is—

1. In a machine of the class described, an upper die, a plurality of horns movable relative to said upper die and to each other, and a die carried by each horn and movable thereby into register with the upper die.

2. In a machine of the class described, a plurality of die carrying horns of different shapes mounted for relative movements to enable the dies carried thereby to be selectively placed in register with the upper die.

3. In a machine of the class described, a plurality of differently shaped swingingly mounted die carrying horns capable of being selectively moved to operative position.

4. In a machine of the class described, a plurality of differently shaped die carrying horns mounted for coaxial swinging movements to enable them to be selectively placed in operative position.

5. A machine of the class described having a welding die and a plurality of relatively movable horns carrying dies for opposing said first die and selectively movable to place the dies carried thereby in register with said first die, one of said horns being substantially straight and the other of angled form.

6. In a machine of the class described, a frame, a bracket carried by said frame, and a plurality of die carrying arms carried for relative movements by said bracket.

7. In a machine of the class described, a frame, a bracket carried by said frame, and a plurality of die carrying arms carried for horizontal swinging movements by said bracket.

8. In a machine of the class described, a frame, a bracket attached thereto, and a plurality of differently shaped die carrying horns carried by said bracket for relative coaxially swinging movements.

9. In a machine of the class described, a frame, a transformer, a bracket attached to the frame and having direct connection with the secondary of the transformer, and a plurality of differently shaped die carrying horns carried for relative swinging movements by said bracket.

10. In a machine of the class described, an upper horn, a die carried for vertical movements relative thereto, a plurality of lower die-carrying horns mounted for relative swinging movements to permit the selective placing of their dies in register with said vertically movable die.

In testimony whereof, I have hereunto signed my name to this specification in the presence of two subscribing witnesses.

ROBERT CLARK PIERCE.

Witnesses:
 NOTT MARMALO,
 FRANK WARREN.